United States Patent
Sancheti et al.

(10) Patent No.: US 9,009,793 B2
(45) Date of Patent: Apr. 14, 2015

(54) DYNAMIC PIN DUAL FACTOR AUTHENTICATION USING MOBILE DEVICE

(75) Inventors: Sachin Prakash Sancheti, Maharashtra (IN); Sidharth Subhash Ghag, Maharashtra (IN)

(73) Assignee: Infosys Limited (IN)

( * ) Notice: Subject to any disclaimer, the term of this patent is extended or adjusted under 35 U.S.C. 154(b) by 80 days.

(21) Appl. No.: 13/179,599

(22) Filed: Jul. 11, 2011

(65) Prior Publication Data

US 2012/0254963 A1 Oct. 4, 2012

(30) Foreign Application Priority Data

Mar. 31, 2011 (IN) .......................... 1071/CHE/2011

(51) Int. Cl.
*G06F 7/04* (2006.01)
*H04L 29/06* (2006.01)
*H04L 9/32* (2006.01)
*G06F 21/00* (2013.01)
*G06F 21/44* (2013.01)

(52) U.S. Cl.
CPC ............ *G06F 21/445* (2013.01); *H04L 9/3215* (2013.01); *H04L 9/3226* (2013.01); *H04L 9/3234* (2013.01); *H04L 2209/80* (2013.01)

(58) Field of Classification Search
USPC .............. 726/4, 7, 19, 21, 22, 5, 26; 713/161, 713/168, 170, 182
See application file for complete search history.

(56) References Cited

U.S. PATENT DOCUMENTS

| | | | |
|---|---|---|---|
| 7,945,952 B1* | 5/2011 | Behforooz ...................... 726/22 |
| 8,087,068 B1* | 12/2011 | Downey et al. .................... 726/4 |
| 8,271,797 B2* | 9/2012 | Araki et al. .................... 713/182 |
| 8,321,933 B2* | 11/2012 | Traenkenschuh et al. ...... 726/22 |
| 8,495,727 B2* | 7/2013 | Ramanathan et al. .......... 726/14 |
| 2005/0268107 A1* | 12/2005 | Harris et al. ................... 713/182 |
| 2007/0186099 A1 | 8/2007 | Beck et al. |
| 2009/0119500 A1* | 5/2009 | Roth et al. ..................... 713/100 |
| 2009/0119754 A1* | 5/2009 | Schubert .......................... 726/4 |
| 2010/0031330 A1* | 2/2010 | Von Ahn et al. .................. 726/5 |
| 2010/0115420 A1* | 5/2010 | De Gibon et al. ............. 715/751 |

OTHER PUBLICATIONS

"MobileID transforms mobile phones, USB flash drives, PCs, PDAs and Tablets into One-Time Password tokens. It is a small app that runs on your mobile devices and generates one-time passwords for strong two-factor authentication", Internet: www.deepnetsecurity.com/tokens/software/mobileid/.
"Dual factor authentication—Express Computer", Internet Article:http://com puter.financialexpress.com /20090427/itinbanking02.shtml.
"SecurID", Official website (http:/ / www. rsa. com/ node. aspx?id=1156) pp. 1-5.

* cited by examiner

*Primary Examiner* — Aravind Moorthy
(74) *Attorney, Agent, or Firm* — Cantor Colburn LLP

(57) ABSTRACT

The present invention provides cost efficient two way authentication method in which the authentication module can be provided as a Plug and Play (PnP) architecture enabling dual layer security with reduced cost where the actions are initiated by a server and user input is received through an audio session for added security. The second level authentication can be carried out with mobile as client device making it cost efficient. The invention can be hosted as an independent service or can be integrated with existing authentication mechanisms, making it elegant for usage.

18 Claims, 8 Drawing Sheets

DYNAMIC PIN DUAL FACTOR AUTHENTICATION USING MOBILE DEVICE

TECHNICAL FIELD

The present invention generally relates to security, more particularly a method and a system for effectively securing authecation of an application using a two factor authentication technique.

BACKGROUND

Generally, banks and/or financial organizations provide portals for performing various activities. Such activities include at least one of an interaction with a customer, login, t ransaction, event functioning etc. For the customer to perform such activities in the portal they need to furnish one or more credentials. These credentials may be considered as a first level of authentication. Such credentials may include a login user-id for the customer and a dedicated password. However, the first level of authentication for performing such activities are more prone to security risk as the criticality of the activities are higher when compared to other activities organized through an e-commerce and any other online usage. The higher security risk makes it essential to have strong authentication methods. Thus, such web application usage i.e. through accessing portal and others systems provides a need for a second level authentication.

The second level authentication is usually carried out by a token generated through a device or client side software in the portal. These methods pose significant disadvantages such as increased cost for providing the token generating device, installing the software on customer's machine, integrating the software with existing system.

Technically, to secure the activities on portal the authentication process are executed in two levels. In the second level authentication step, the user is asked to input a secondary password dedicated for this purpose along with the user credentials such as the user-id and the dedicated password or it is executed with the secondary password generated by the device that the customer may possess. Some portals may require the customer to enter a combination of the customer details such as birth date, address etc. Some services send the second level password to the customer by text, message, e-mail or other communication means. Few portals may require the customer to send text messages in a prescribed format after finishing the first level of authentication.

The second level of authentication may also be performed through text messages. But, the websites that offers second level of authentication such as way2sms provides sending text messages without possessing a mobile phone.

All such mechanism toughed in the prior art for securing activities of the customer in the portal by the second level authentication pose one or more problem. Such problem may include the further increase in security, as the secondary password is generally communicated through a non encrypted means. Accordingly there is a need for providing stronger second level authentication with reduced cost.

SUMMARY OF THE INVENTION

The present invention provides a cost efficient two way authentication method in which the authentication module can be provided as a Plug and Play (PnP) architecture enabling dual layer security with reduced cost where the actions are initiated by server and receiving the user input through audio session for added security.

In one embodiment of the present invention a computer method of authenticating a customer or user at a portal is detailed. The method comprises obtaining the customer credentials through the portal and validating the user based on the obtained credentials as a first level authentication. Subsequently, as a part of second level authentication the invention details generating a code at the portal and establishing an audio session with the customer's registered device to receive the code from the customer for authenticating the user at the portal.

In another embodiment of the present invention, as a part of second level authentication of the customer at the portal, the invention teaches obtaining code from the user through the registered device along with the credentials required for first level authentication, if one or more credentials provided by the customer as a part of first level authentication is wrong.

The invention teaches establishing a session with the customer through their registered devices for receiving the code and thereby minimizes the possibility of fraud which may be inevitable with the teachings in the prior art. Also, the invention can be provided as an independent service so that it can be extended to already existing validation.

BRIEF DESCRIPTION OF THE DRAWINGS

The above mentioned features as well other features, aspects, and advantages of the present invention will become better understood when the following detailed description is read with reference to the accompanying drawings in which like characters represent like parts throughout the drawings, wherein.

DETAILED DESCRIPTION

The following description is full and informative description of the best method and system presently contemplated for carrying out the present invention, which is known to the inventors at the time of filing the patent application. Of course, many modifications and adaptations will be apparent to those skilled in the relevant arts in view of the following description, in view of the accompanying drawings and the appended claims. While the system and method described herein are provided with a certain degree of specificity, the present technique may be implemented with either greater or lesser specificity, depending on the needs of the user. Further, some of the features of the present technique may be used to advantage without the corresponding use of other features described in the following paragraphs. As such, the present description should be considered as merely illustrative of the principles of the present technique and not in limitation thereof, since the present technique is defined solely by the claims.

Figure 1:
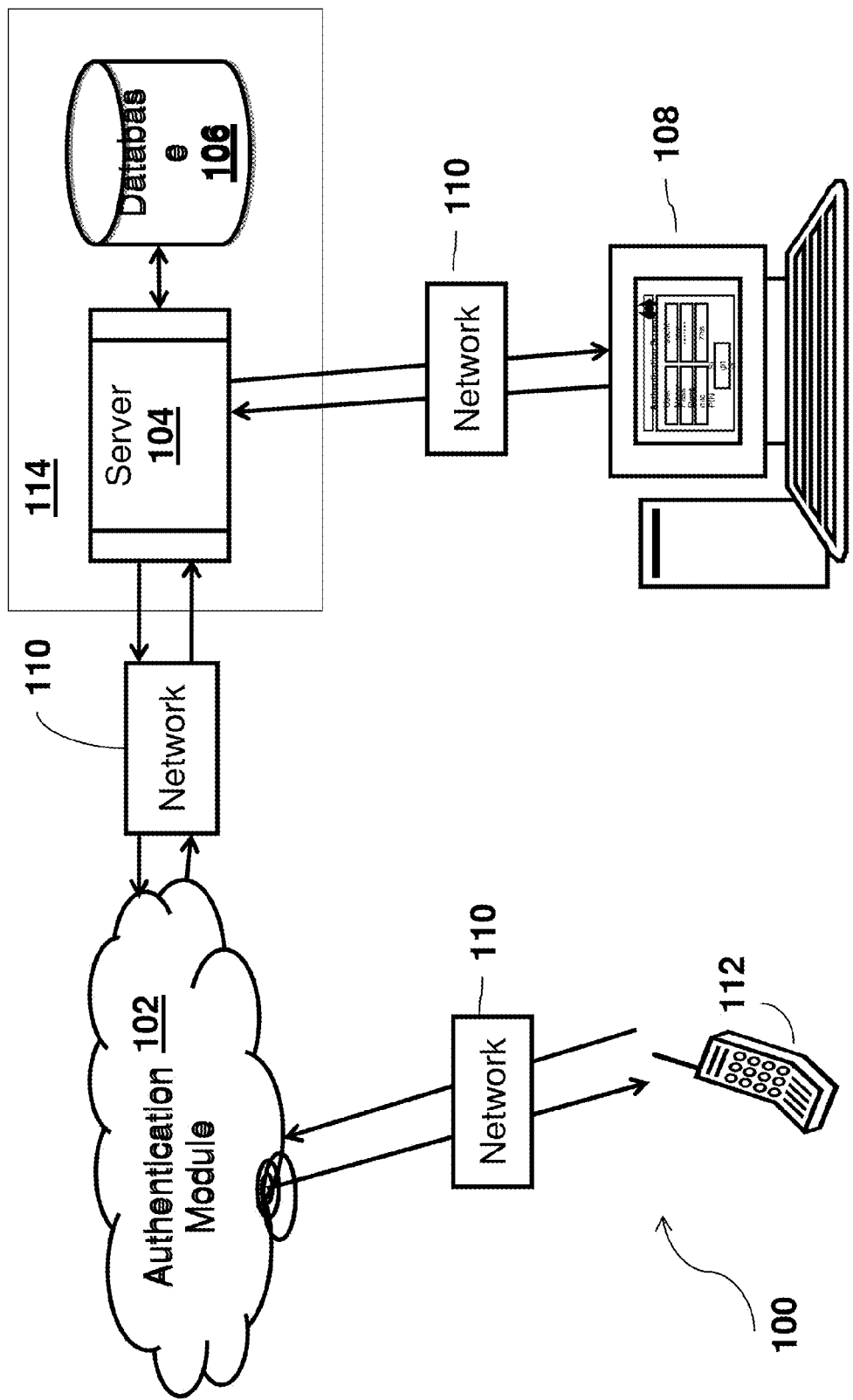
FIG. 1 is a block diagram illustrating various modules of two factor authentication, according to one embodiment of the present invention.

FIG. 1 is the diagram illustrating different segments for one embodiment of the invention. In one embodiment of the present invention, the system 100 comprises at least one of an authentication module 102, a server 104 coupled with a database 106, a registered device 112 and a computer terminal 108. The server and the database may form the deployment module 114 of the system 100.

The database 106 may contain user data, transaction data and code for second level authentication. The user data may include user profile information, contact information to establish an audio session and user preferences. The transaction data may include at least one unique identifier for transaction, transaction data associated with a particular user and authentication flag. The transaction code is a number generated randomly and expires after single usage.

The server 104 may be employed to pass the necessary details to authentication module through the network 110.

The authentication module 102 may initiate the call to validate the user for second level authentication. In one embodiment of the present invention, the authentication module 102 may be maintained in at least one of cloud environment. In another embodiment of the present invention, the authentication module 102 may be maintained as a distributed, client-server, peer-to-peer and grid network. Maintaining the authentication module 102 separate from the deployment part facilitates the authentication module to be hosted as Software as a Service (SaaS) model. Also, it facilitates the module to be integrated with existing validating mechanisms without changes in design.

The portal (not shown) accessed through the computer terminal 108 may prompt the user to enter the user-id and password. The portal may then send the received user credentials to the server 104 for validation through the network 110 to the server 104. The portal may additionally display the code for a second level authentication, after verifying the authenticity of the user through received user-id and password i.e. checking for the used-id or username with corresponding password. The received user name and the code may be passed to the authentication module 102 by the server 104 through the network 110. The authentication module 102 may then establishes an audio session with a registered user device 112 to receive the second level authentication code from the user.

In one embodiment of the present invention, the registered user device 112 may be a mobile. On receiving the code, by the user through the established audio session the authentication module may compare the code entered by the user and the code displayed by sever 104. If both the codes are same then the authentication module 112 may send a flag to sever 104 specifying valid authentication else the authentication module 112 may send a flag to the server 104 specifying invalid authentication.

In one embodiment of the present invention the registered user device is authenticated through an International Mobile Equipment Identity (IMEI) or a caller identification number.

Figure 2:
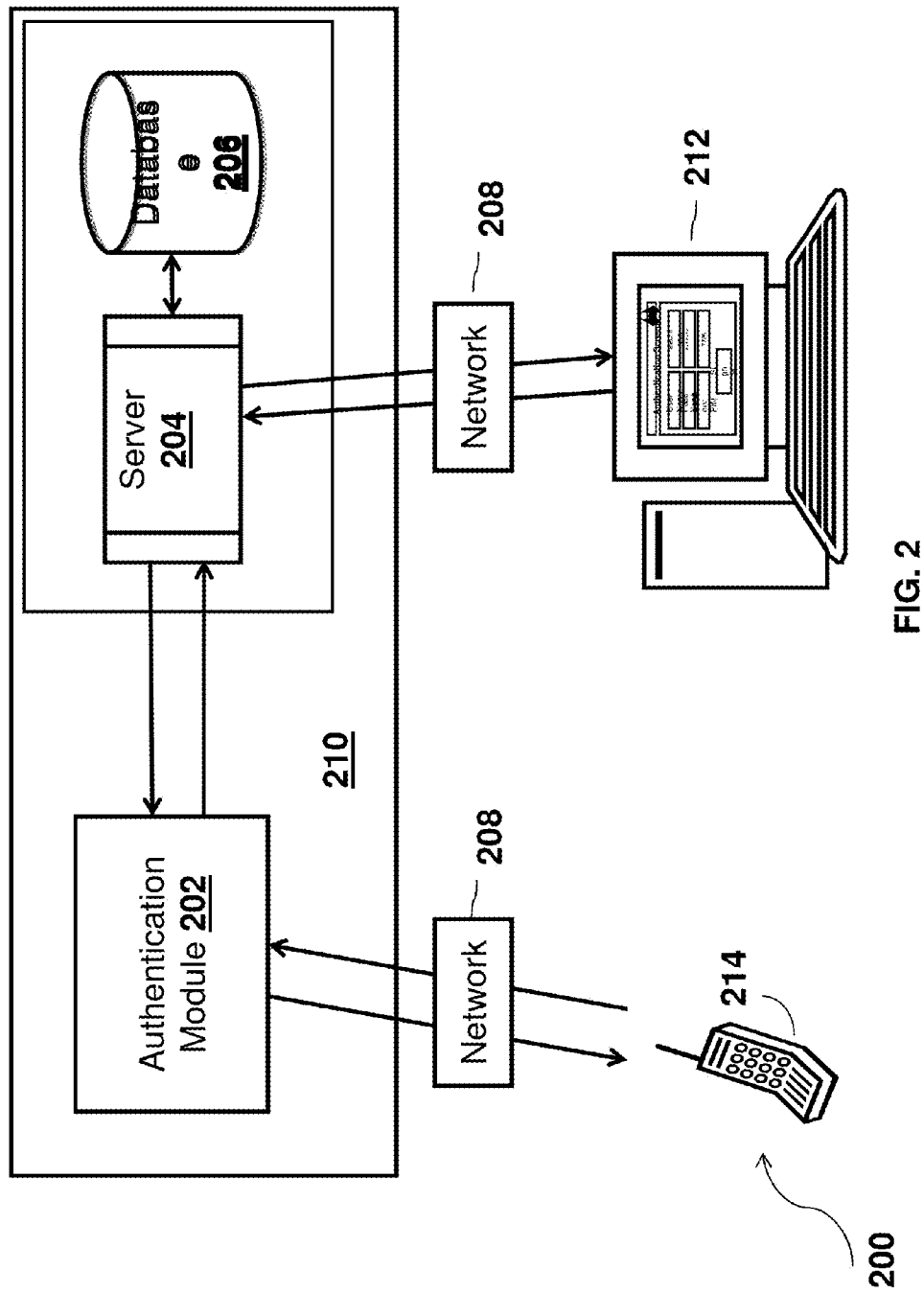
FIG. 2 is a block diagram illustrating various modules of two factor authentication, according to one embodiment of the present invention.

FIG. 2 is the diagram illustrating different segments for another embodiment of the invention. The system 200 may comprise at least one of an authentication module 202, server 204, database 206, registered device 214 and a computer terminal 212. The authentication module 202, the server 207 and the database 206 form the deployment module 210 of the system 200. The database 206 may contain user data, transaction data and code for second level authentication. The user data may include user profile information, contact information to establish an audio session and user preferences. The transaction data may include at least one unique identifier for transaction, transaction data associated with a particular user and authentication flag. The deployment module 210 may be maintained in at least one of a distributed, client-server, peer-to-peer, cloud and grid network. The server 204 communicates with the authentication module 202 through web service calls.

The portal (not shown) accessed through the computer terminal 212, prompts the user to enter the username and password. On receiving the user credentials, the portal may display the code for second level authentication. The received user name and the code are passed to the authentication module 202 by the server 204. The authentication module 202 may establish an audio session with the user through the registered device 214 to receive the second level authentication code. On receiving the code, by the user, through the established audio session, the authentication module 202 may compare the code entered by the user and the code displayed by the server 204. If both the codes are same then the authentication module 202 may send a flag to the sever 204 specifying valid authentication else the authentication module 202 may send a flag to the server 204 specifying invalid authentication.

In one embodiment of the present invention, the invalid authentication may include at least one of session time out, access denial, wrong operation etc which may lead to failed authentication.

Figure 3:
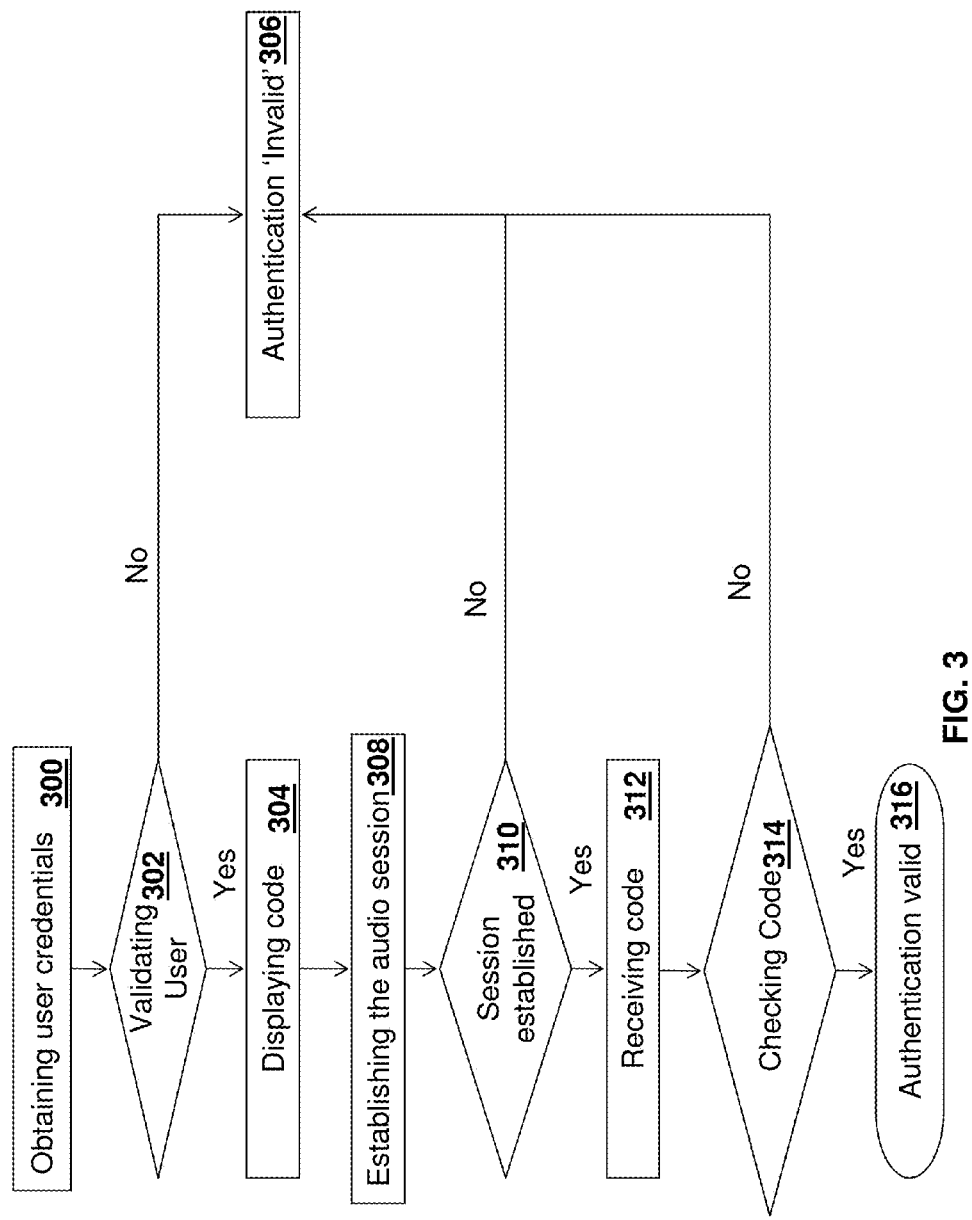
FIG. 3 is a flow diagram illustrating sequences of authentication according to one embodiment of the invention.

FIG. 3 explains process flow in one embodiment of the invention. The invention teaches obtaining user credentials such as username and password from the user through the portal at step 300. The obtained user credentials may be sent to the server for validation as mentioned in step 302. The validation of the user credentials includes checking for an existing username and a corresponding password, if the username exists. If the username doesn't exist or a wrong password is entered for an existing username then the authentication is termed 'invalid' as mentioned in step 306. After the step of validating the user, the server may display the code to the user as mentioned in step 304 for a second level authentication of the user. Simultaneously the user details may be passed to the authentication module, for the purpose of attempting to establish the audio session as mentioned in step 308 with the user. The authentication module may further check whether the session is established properly/successfully with the users registered device. If the authentication module is not able establish audio session then it terms the authentication 'invalid' as mentioned in step 306. If the session is established then the user is asked to enter the code as mentioned in step 312 which is shown on the portal to the user through a computer terminal. The user may have to enter the code through their registered device during the session. The authentication module may check whether the code entered by the user during the established audio session and the code displayed to the user on the portal are same, as mentioned in step 314. If both the codes are same then the authentication is termed 'valid' as mentioned in step 316 else 'invalid' as mentioned in step 306.

Figure 3A:
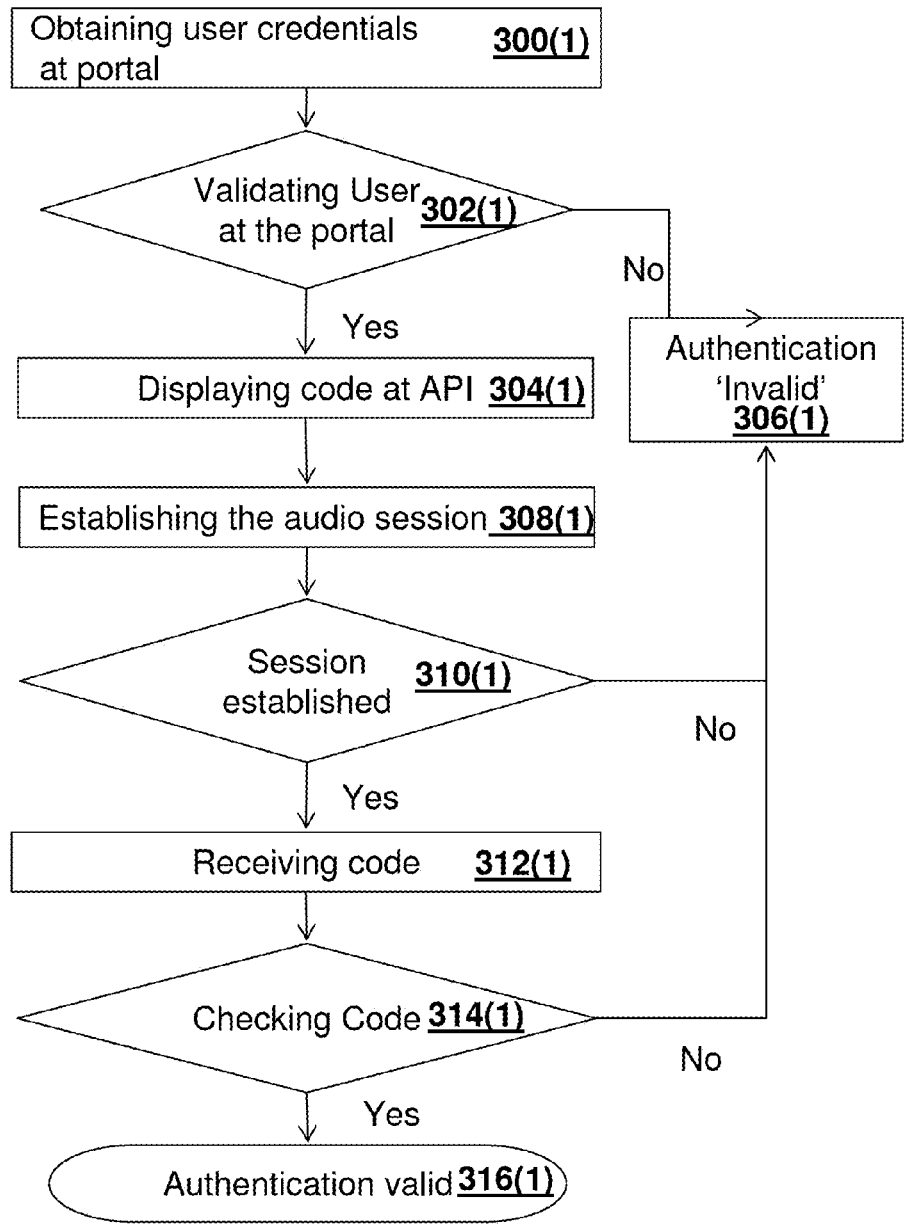
FIG. 3A is a flow diagram illustrating sequences of authentication according to another embodiment of the invention.

FIG. 3A explains process flow in another embodiment of the invention. The invention teaches obtaining user credentials such as username and password from the user through the portal at step 300(1). The obtained user credentials may be sent to the server for validation as mentioned in step 302(1). The validation of the user credentials includes checking for an existing username and a corresponding password, if the username exists. If the username doesn't exist or a wrong password is entered for an existing username then the authentication is termed 'invalid' as mentioned in step 306(1). After the step of validating the user, the server may display the code at a computing interface to the user as mentioned in step 304(1) for a second level authentication of the user. Simultaneously the user details may be passed to the authentication module, for the purpose of attempting to establish the audio session as mentioned in step 308(1) with the user. The authentication module may further check whether the session is established properly/successfully with the users registered device. If the authentication module is not able establish audio session then it terms the authentication 'invalid' as mentioned in step 306(1). If the session is established then the user is asked to enter the code as mentioned in step 312(1) which is shown on the computing interface to the user through a computer terminal. The user may have to enter the code through their registered device during the session. The authentication module may check whether the code entered by the user during the established audio session and the code displayed to the user on the computing interface are same, as mentioned in step 314(1). If both the codes are same then the authentication is termed 'valid' as mentioned in step 316(1) else 'invalid' as mentioned in step 306(1).

In one embodiment of the present invention a computing interface may be a portal, which further displays the code to the user. In another embodiment of the present invention a computing interface may be a pop-up interface for the existing portal. In another embodiment of the present invention a computing interface may be an Application Programming Interface (API). In case of an API the code is passed to the existing portal or the pop-up interface where in the code is displayed to the user. After validation of the user credentials from the existing portal, the pop-up interface may appear with the code showing in it. At a backend of the existing portal, post validation of the user credential the existing portal may route to the computing interface with the user details for subsequent verification.

Figure 4:
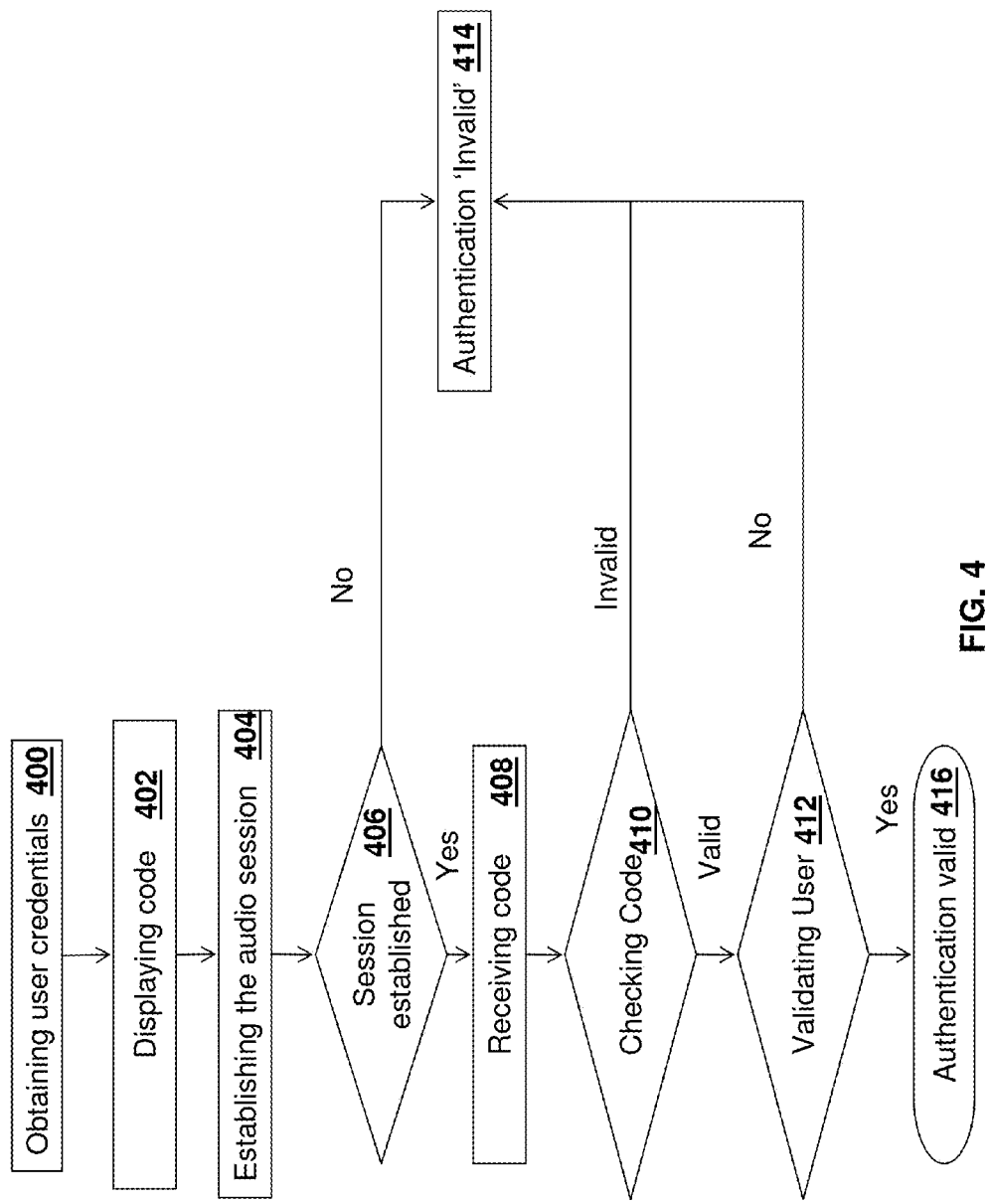
FIG. 4 is a flow diagram illustrating sequences of authentication according to one embodiment of the invention.

FIG. 4 explains process flow in one embodiment of the invention. The user credentials such as username and password are obtained from the user through the portal as mentioned in step 400. Upon receiving the user credentials, the portal may display the second level authentication code to the user as mentioned in step 402. Simultaneously the user details may be passed to the authentication module, for the purpose of attempting to establish the audio session with the user, as mentioned in step 406. The authentication module may further check whether the session is established properly/successfully with the users registered device. If the authentication module is not able establish audio session then it terms the authentication 'invalid' as mentioned in step 414. If the session is established then the user is asked to enter the code as mentioned in step 408, through the user registered device. The user may have to enter the code through their registered device during the session. The authentication module may check whether the code entered by the user during the established audio session and the code displayed to the user on the portal are same. Also the authentication module checks for validity of received user credentials i.e. to check for an existing username and a corresponding password, if the username exists. The authentication is termed 'invalid' 414 in any of the following cases: If the username doesn't exist; a wrong password is entered for an existing username; if the code displayed at the portal and the code entered by the user through the established audio session are different. The authentication is termed valid 416 only if all the three cases are not encountered.

The invention can be maintained as a separate service and can be extended to already existing authenticating methods of portals. The service maintained separately can be integrated to the existing authenticating mechanisms of any desired portal and the results of the separate authentication can be communicated to the portal through web service calls. This makes the invention cost efficient and provides flexibility.

Public network is a network which is configured with a public Internet Protocol (IP) address and visible to devices in other network such as the internet. Private network is a network in which the devices are not visible to outside network. Hybrid network is a combination of public and private networks.

Figure 4A:
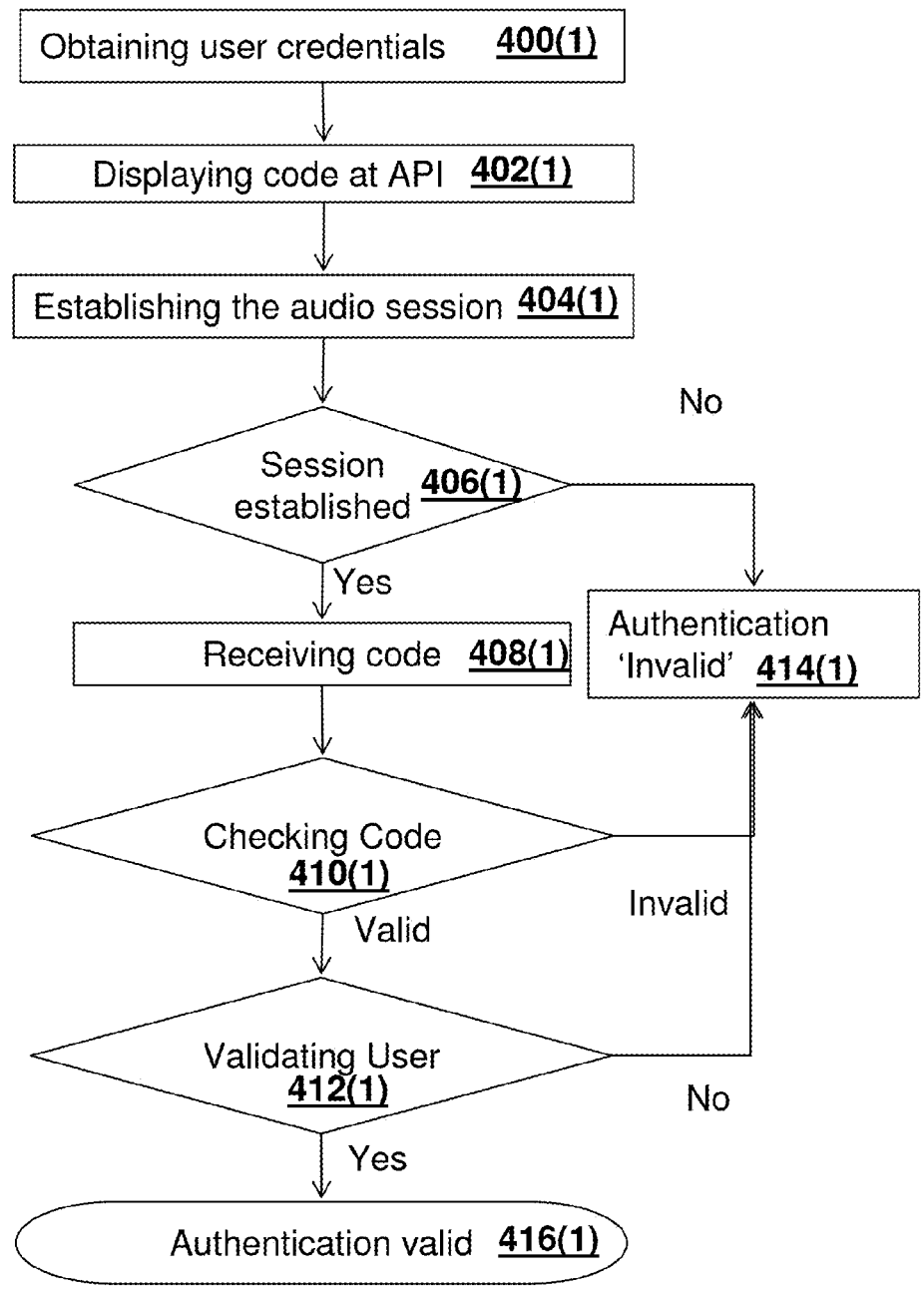
FIG. 4A is a flow diagram illustrating sequences of authentication according to another embodiment of the invention.

FIG. 4A explains process flow in one embodiment of the invention. The user credentials such as username and password are obtained from the user through the portal as mentioned in step 400(1). Upon receiving the user credentials, the computing interface may display the second level authentication code to the user as mentioned in step 402(1). Simultaneously the user details may be passed to the authentication module, for the purpose of attempting to establish the audio session with the user, as mentioned in step 406(1). The authentication module may further check whether the session is established properly/successfully with the user registered device. If the authentication module is not able establish audio session then it terms the authentication 'invalid' as mentioned in step 414(1). If the session is established then the user is asked to enter the code as mentioned in step 408(1), through the user registered device. The user may have to enter the code through their registered device during the session. The authentication module may check whether the code entered by the user during the established audio session and the code displayed to the user on the portal are same. Also the authentication module checks for validity of received user credentials i.e. to check for an existing username and a corresponding password, if the username exists. The authentication is termed 'invalid' 414(1) in any of the following cases: If the username doesn't exist; a wrong password is entered for an existing username; if the code displayed at the portal and the code entered by the user through the established audio session are different. The authentication is termed valid 416(1) only if all the three cases are not encountered.

In one embodiment of the present invention a computing interface may be a portal. In another embodiment of the present invention a computing interface may be a pop-up interface for the existing portal. In another embodiment of the present invention present invention a computing interface may be an Application Programming Interface (API). In case of an API the code is passed to the existing portal or the pop-up interface where in the code is displayed to the user.

The invention can be maintained as a separate service and can be extended to already existing authenticating methods of portals. The service maintained separately can be integrated to the existing authenticating mechanisms of any desired portal and the results of the separate authentication can be communicated to the portal through web service calls. This makes the invention cost efficient and provides flexibility.

Public network is a network which is configured with a public Internet Protocol (IP) address and visible to devices in other network such as the internet. Private network is a network in which the devices are not visible to outside network. Hybrid network is a combination of public and private networks.

Figure 5:
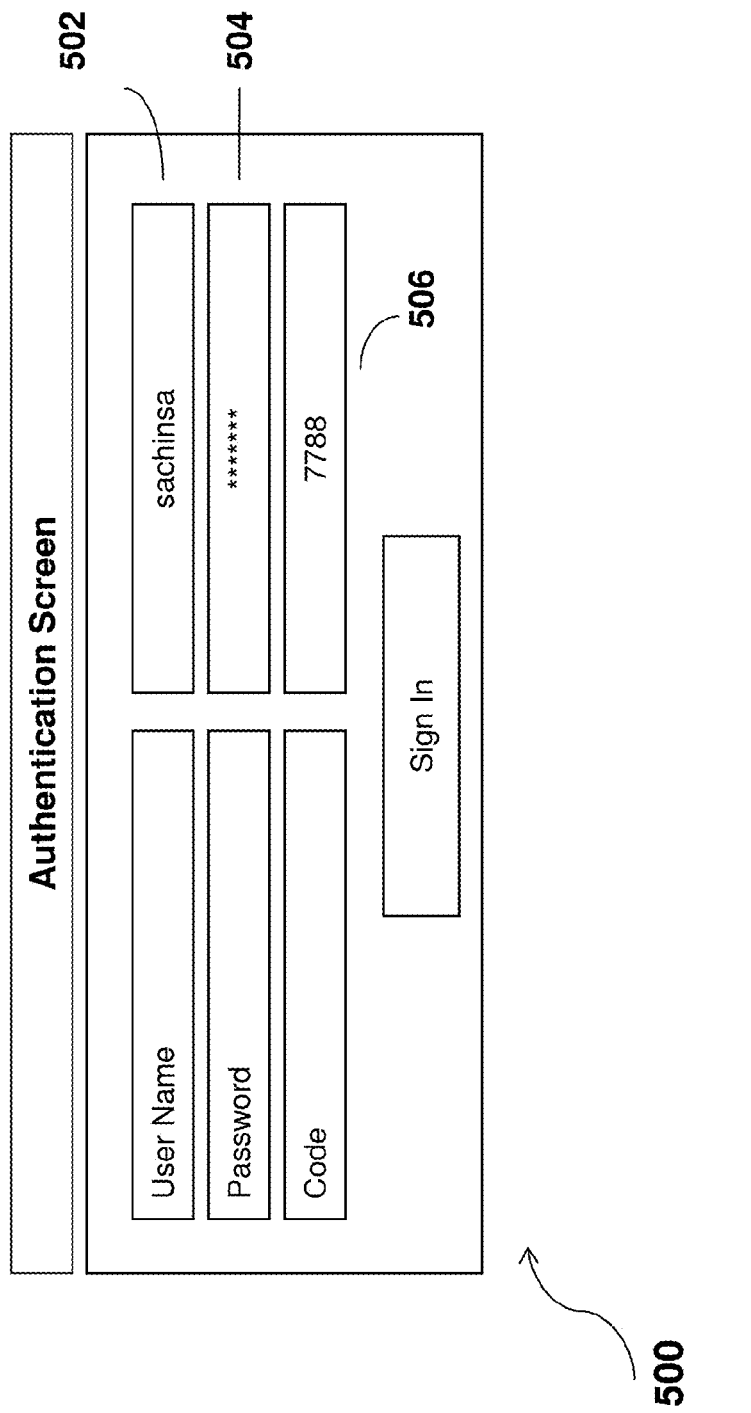
FIG. 5 is the screen showing authentication screen according to one embodiment of the invention.

FIG. 5 is the diagram detailing the screen for second level authentication. The screen contains text boxes to enter user name 502 and password 504. The code for second level authentication 506 may be popped up before or after verification of username and password depending upon the system as per one or another embodiment of the present invention.

While the present invention has been related in terms of the foregoing embodiments, those skilled in the art will recognize that the invention is not limited to the embodiments depicted. The present invention can be practiced with modification and alteration within the spirit and scope of the appended claims. Thus, the description is to be regarded as illustrative instead of restrictive on the present invention.

Exemplary Computing Environment

Figure 6:
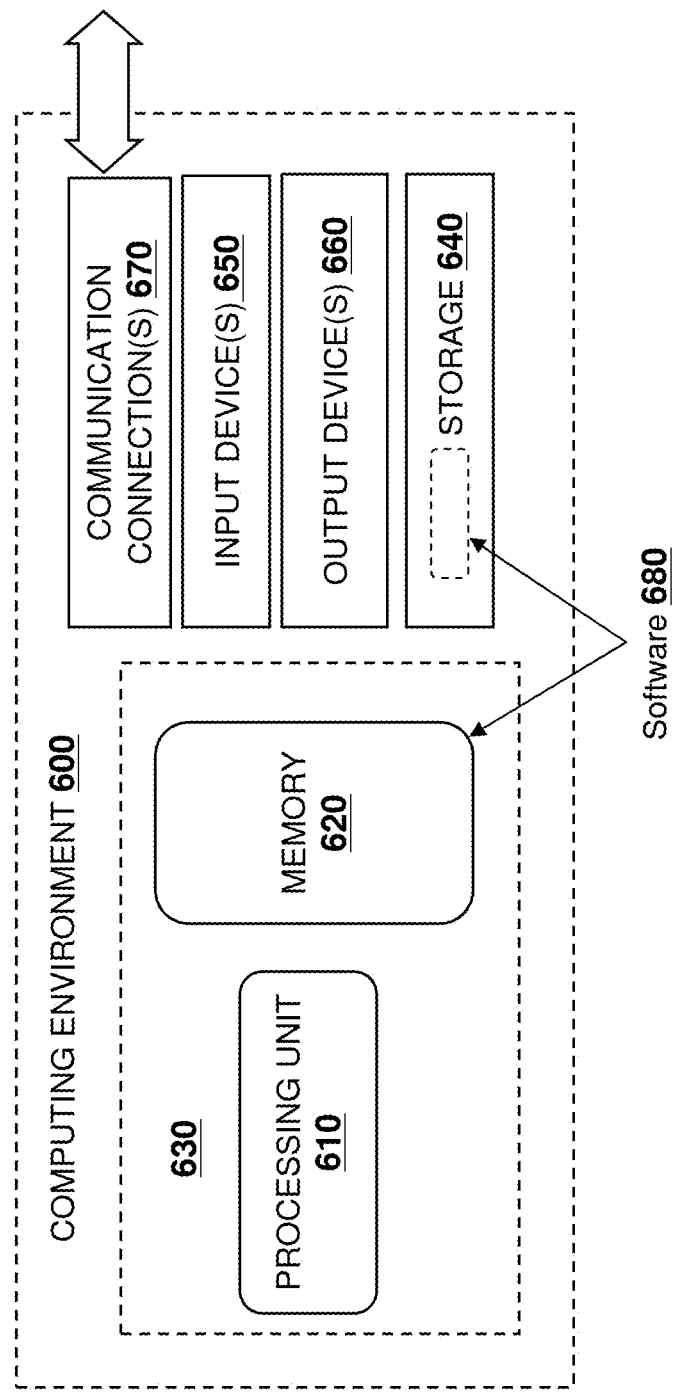
FIG. 6 is a system illustrating a generalized computer network arrangement, in one embodiment of the present technique.

One or more of the above-described techniques can be implemented in or involve one or more computer systems. FIG. 6 illustrates a generalized example of a computing environment 600. The computing environment 600 is not intended to suggest any limitation as to scope of use or functionality of described embodiments.

With reference to FIG. 6, the computing environment 600 includes at least one processing unit 610 and memory 620. In FIG. 6, this most basic configuration 630 is included within a dashed line. The processing unit 610 executes computer-executable instructions and may be a real or a virtual processor. In a multi-processing system, multiple processing units execute computer-executable instructions to increase processing power. The memory 620 may be volatile memory (e.g., registers, cache, RAM), non-volatile memory (e.g., ROM, EEPROM, flash memory, etc.), or some combination of the two. In some embodiments, the memory 620 stores software 680 implementing described techniques.

A computing environment may have additional features. For example, the computing environment 600 includes storage 640, one or more input devices 650, one or more output devices 660, and one or more communication connections 670. An interconnection mechanism (not shown) such as a bus, controller, or network interconnects the components of the computing environment 600. Typically, operating system software (not shown) provides an operating environment for other software executing in the computing environment 600, and coordinates activities of the components of the computing environment 600.

The storage 640 may be removable or non-removable, and includes magnetic disks, magnetic tapes or cassettes, CD-ROMs, CD-RWs, DVDs, or any other medium which can be used to store information and which can be accessed within the computing environment 600. In some embodiments, the storage 640 stores instructions for the software 680.

The input device(s) 650 may be a touch input device such as a keyboard, mouse, pen, trackball, touch screen, or game controller, a voice input device, a scanning device, a digital camera, or another device that provides input to the computing environment 600. The output device(s) 660 may be a display, printer, speaker, or another device that provides output from the computing environment 600.

The communication connection(s) 670 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the general context of computer-readable media. Computer-readable media are any available media that can be accessed within a computing environment. By way of example, and not limitation, within the computing environment 600, computer-readable media include memory 620, storage 640, communication media, and combinations of any of the above.

Having described and illustrated the principles of our invention with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

In view of the many possible embodiments to which the principles of our invention may be applied, we claim as our invention all such embodiments as may come within the scope and spirit of the following claims and equivalents thereto.

The invention claimed is:

1. A computer-implemented method of authenticating a user for usage of a portal at a user terminal, the method comprising steps of:

obtaining at least one credential inputted by the user through the portal, the portal being accessed by the user via the user terminal;

validating the user based on the obtained at least one credential;

displaying, a code at the portal accessed by the user via the user terminal, wherein the code is generated by a server of the portal;

transmitting, by the server, one or more user details and the generated code to an authentication module, wherein the authentication module is maintained as a separate entity that is independent of the server of the portal;

initiating establishment, by the authentication module in communication with the server, of an audio session with the user at a registered device of the user, wherein the registered device is different from the user terminal;

checking, by the authentication module, the establishment of the audio session at the registered device and invalidating the authentication of the user on failing to establish the audio session;

receiving, by the authentication module, the code from the user through the registered device if the audio session is established with the user;

comparing, by the authentication module, the code received from the user via the registered device during the established audio session with the generated code received from the server of the portal; and authenticating the user for usage of the portal at the user terminal based on the comparison.

2. The method of claim 1, wherein the credential comprises at least one of a username and a password.

3. The method of claim 1, wherein the code is at least one of a group containing password, security answer, CAPTCHA, and any identification number.

4. The method of claim 1, wherein the portal can be used for at least one of authenticating a user login, transaction, user profile change, and application access.

5. The method of claim 1, wherein the code generated can be at least one of a preset password, random characters generated at run time, and other user information.

6. A computer-implemented method of authenticating a user for usage of a portal at a user terminal, the method comprising steps of:

obtaining at least one credential inputted by the user through the portal, the portal being accessed by the user via the user terminal;

validating the user based on the obtained at least one credential;

displaying, a code at a computing interface accessed by the user via the user terminal, wherein the code is generated by a server of the portal;

transmitting, by the server, one or more user details and the generated code to an authentication module, wherein the authentication module is maintained as a separate entity that is independent of the server of the portal;

initiating establishment, by the authentication module in communication with the server, of an audio session with the user at a registered device of the user, wherein the registered device is different from the user terminal;

checking, by the authentication module, the establishment of the audio session at the registered device and invalidating the authentication of the user on failing to establish the audio session;

receiving, by the authentication module, the code from the user through the registered device if the audio session is established with the user;

comparing, by the authentication module, the code received from the user via the registered device during the established audio session with the generated code received from the server of the portal; and authenticating the user for usage of the portal at the user terminal based on the comparison.

7. A computer-implemented method of authenticating a user for usage of a portal at a user terminal, the method comprising steps of:

obtaining at least one credential inputted by the user through the portal, the portal being accessed by the user via the user terminal;

displaying, a code at the portal accessed by the user via the user terminal, wherein the code is generated by a server of the portal;

transmitting, by the server, one or more user details and the generated code to an authentication module, wherein the authentication module is maintained as a separate entity that is independent of the server of the portal;

initiating establishment, by the authentication module in communication with the server, of an audio session with the user at a registered device of the user, wherein the registered device is different from the user terminal;

checking, by the authentication module, the establishment of the audio session at the registered device and invalidating the authentication of the user on failing to establish the audio session;

receiving, by the authentication module, the code from the user through the registered device if the audio session is established with the user;

comparing, by the authentication module, the code received from the user via the registered device during the established audio session with the generated code received from the server of the portal; and authenticating the user for usage of the portal at the user terminal based on the comparison.

8. The method of claim 7, wherein the credential comprises at least one of a username and a password.

9. The method of claim 7, wherein the code is at least one of a group containing password, security answer, CAPTCHA, and any identification number.

10. The method of claim 7, wherein the portal can be used for at least one of authenticating a user login, transaction, user profile change, and application access.

11. The method of claim 7, wherein the code generated can be at least one of a preset password, random characters generated at run time, and other user information.

12. A computer-implemented method of authenticating a user for usage of a portal at a user terminal, the method comprising steps of:

obtaining at least one credential inputted by the user through the portal, the portal being accessed by the user via the user terminal;

displaying, a code at a computing interface accessed by the user via the user terminal, wherein the code is generated by a server of the portal;

transmitting, by the server, one or more user details and the generated code to an authentication module, wherein the authentication module is maintained as a separate entity that is independent of the server of the portal;

initiating establishment, by the authentication module in communication with the server, of an audio session with the user at a registered device of the user, wherein the registered device is different from the user terminal;

checking, by the authentication module, the establishment of the audio session at the registered device and invalidating, by the authentication module, the authentication of the user on failing to establish the audio session;

receiving, by the authentication module, the code from the user through the registered device if the audio session is established with the user;

comparing, by the authentication module, the code received from the user via the registered device during the established audio session with the generated code received from the server of the portal; and authenticating the user for usage of the portal at the user terminal based on the comparison.

13. A system for authenticating a user for usage of a portal at a user terminal, the system comprising:

a memory comprising program instructions;

a processor configured to execute the program instructions stored in the memory;

an user interface in communication with the processor and configured to receive at least one user credential, the user interface being accessed by the user via the user terminal;

a server of the portal in communication with the processor and configured to:

display a code at the user interface on receiving the user credentials; and transmit one or more user details and the generated code to an authentication module, wherein the authentication module is maintained as a separate entity that is independent of the server of the portal;

the authentication module, in communication with the processor and configured to:

initiate establishment of an audio session with a registered user device based on the at least one user credential received from the server, wherein the registered user device is different from the user terminal;

check the establishment of the audio session at the registered device and invalidate the authentication of the user on failing to establish the audio session;

receive the code from the user through the registered device if the audio session is established with the user;

compare the code received from the user via the registered device during the established audio session with the generated code received from the server of the portal; and authenticate the user for usage of the portal at the user terminal based on the comparison.

14. A system of claim 13, wherein the registered device is at least one of a laptop, a desktop computer, a wireless device, a wireless email device, an integrated device, a mobile phone and a personal digital assistant (PDA).

15. A system of claim 13, where in the audio session comprises at least one of audio input, audio output, and audio interaction.

16. A system of claim 13, where in the network can be one of private, public and hybrid.

17. A non-transitory computer usable medium having a computer readable program code embodied therein for authenticating a user for usage of a portal at a user terminal comprising a program code adapted for:
- obtaining at least one credential inputted by the user through the portal, the portal being accessed by the user via the user terminal;
- validating the user based on the obtained at least one credential;
- displaying, a code at the portal accessed by the user via the user terminal, wherein the code is generated by a server of the portal;
- transmitting, by the server, one or more user details and the generated code to an authentication module, wherein the authentication module is maintained as a separate entity that is independent of the server of the portal;
- initiating establishment, by the authentication module in communication with the server, of an audio session with the user at a registered device of the user, wherein the registered device is different from the user terminal;
- checking, by the authentication module, the establishment of the audio session at the registered device and invalidating the authentication of the user on failing to establish the audio session;
- receiving the code from the user through the registered device if the audio session is established with the user;
- comparing, by the authentication module, the code received from the user via the registered device during the established audio session with the generated code received from the server of the portal; and
- authenticating the user for usage of the portal at the user terminal based on the comparison.

18. A non-transitory computer usable medium having a computer readable program code embodied therein for authenticating a user for usage of a portal at a user terminal comprising a program code adapted for:
- obtaining at least one credential inputted by the user through the portal, the portal being accessed by the user via the user terminal;
- displaying, a code at the portal accessed by the user via the user terminal, wherein the code is generated by a server of the portal;
- transmitting, by the server, one or more user details and the generated code to an authentication module, wherein the authentication module is maintained as a separate entity that is independent of the server of the portal;
- initiating establishment, by the authentication module in communication with the server, of an audio session with the user at a registered device of the user, wherein the registered device is different from the user terminal;
- checking, by the authentication module, the establishment of the audio session at the registered device and invalidating the authentication of the user on failing to establish the audio session;
- receiving, by the authentication module, the code from the user through the registered device if the audio session is established with the user;
- comparing, by the authentication module, the code received from the user via the registered device during the established audio session with the generated code received from the server of the portal; and
- authenticating the user for usage of the portal at the user terminal based on the comparison.

\* \* \* \* \*